(12) United States Patent
Su et al.

(10) Patent No.: US 12,517,614 B2
(45) Date of Patent: Jan. 6, 2026

(54) TOUCH CONTROL CIRCUIT AND TOUCH DETECTION METHOD THEREOF

(71) Applicant: NOVATEK Microelectronics Corp., Hsin-Chu (TW)

(72) Inventors: Chen-Shan Su, Taoyuan (TW);
Yun-Hsiang Yeh, Hsinchu (TW);
Ta-Keng Weng, Taichung (TW);
Chung-Cher Lin, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/749,658

(22) Filed: Jun. 21, 2024

(65) Prior Publication Data
US 2025/0138678 A1    May 1, 2025

Related U.S. Application Data

(60) Provisional application No. 63/594,413, filed on Oct. 30, 2023.

(51) Int. Cl.
*G06F 3/041* (2006.01)

(52) U.S. Cl.
CPC .............. *G06F 3/04186* (2019.05); *G06F 2203/04101* (2013.01)

(58) Field of Classification Search
CPC .................................................. G06F 3/04186
See application file for complete search history.

(56) References Cited

U.S. PATENT DOCUMENTS

| | | | | |
|---|---|---|---|---|
| 2021/0373739 A1* | 12/2021 | Li | ............ | G06F 3/041661 |
| 2022/0391067 A1* | 12/2022 | Chugunov | .......... | G06F 3/04166 |
| 2023/0418413 A1* | 12/2023 | Chugunov | .......... | G06F 3/04845 |

FOREIGN PATENT DOCUMENTS

| | | |
|---|---|---|
| CN | 114185459 A | 3/2022 |
| TW | 202234218 A | 9/2022 |
| WO | 2022/256494 A1 | 12/2022 |

* cited by examiner

*Primary Examiner* — Chun-Nan Lin
(74) *Attorney, Agent, or Firm* — Winston Hsu

(57) ABSTRACT

A touch detection method for generating a report includes obtaining a position of a touch point; determining a plurality of reference sensor pads according to the position of the touch point; determining a weight for each of the plurality of reference sensor pads according to the position of the touch point; evaluating a first evaluated peak value of the touch point based on sensing values of the plurality of reference sensor pads and the corresponding weights; and determining whether to generate the report for the touch point according to the first evaluated peak value and a first threshold.

24 Claims, 11 Drawing Sheets

(a)

(b)

(c)

TOUCH CONTROL CIRCUIT AND TOUCH DETECTION METHOD THEREOF

CROSS REFERENCE TO RELATED APPLICATIONS

This application claims the benefit of U.S. Provisional Application No. 63/594,413, filed on Oct. 30, 2023. The content of the application is incorporated herein by reference.

BACKGROUND OF THE INVENTION

1. Field of the Invention

The present invention relates to a touch control circuit and a touch detection method thereof, and more particularly, to a touch control circuit and a touch detection method thereof for improving the stability of generating reports.

2. Description of the Prior Art

With the rapid development of touch detection technology, touch panels have been widely used in many electronic devices, such as mobile phones, satellite navigation, tablets, personal digital assistants (PDAs), and notebook computers. Touch panels are easy to operate and highly intuitive to use, making them popular with consumers and gradually becoming a mainstream trend in the market.

The current touch detection technology decides whether to generate a report for a touch event (i.e., determination of a make or a break state) by detecting changes in the sensing value of the sensor pads on the touch panel. However, there are many factors that affect the sensing value detected by the sensor pads, including the distance between the finger (or stylus) and the touch panel, the size of the finger contact area, and the position of the finger touch point, etc., which all affect the determination for generating the report. For example, when the finger approaches the touch panel from far to near but does not actually contact the touch panel, the sensing value can be detected as gradually changing from small to large. When the finger actually contacts the touch panel and continues to press down, the total amount of sensing values that can be detected increases because of an increase in the finger contact area.

In practical applications, it is expected that the reports are generated only when the finger is as close as possible to the touch panel. Therefore, a hovering height of the finger (or stylus) based on the surface of the touch panel is estimated through the sensing values of the sensor pads so as to determine whether or not to generate the reports for the touch event.

SUMMARY OF THE INVENTION

Therefore, the present invention aims to provide a touch control circuit and a touch detection method thereof for improving the stability of generating reports.

An embodiment of the present invention discloses a touch detection method for generating a report. The touch detection method includes obtaining a position of a touch point; determining a plurality of reference sensor pads according to the position of the touch point; determining a weight for each of the plurality of reference sensor pads according to the position of the touch point; evaluating a first evaluated peak value of the touch point based on sensing values of the plurality of reference sensor pads and the corresponding weights; and determining whether to generate the report for the touch point according to the first evaluated peak value and a first threshold.

An embodiment of the present invention further discloses a touch control circuit for generating a report. The touch control circuit includes a driving circuit, a sensing circuit and a processing unit. The driving circuit is coupled to a touch panel and configured to provide driving signals to the touch panel. The sensing circuit is coupled to a plurality of sensor pads of the touch panel. The processing unit is coupled to the driving circuit and the sensing circuit, and is configured to execute instructions including obtaining a position of a touch point from the sensing circuit; determining a plurality of reference sensor pads according to the position of the touch point; determining a weight for each of the plurality of reference sensor pads according to the position of the touch point; evaluating a first evaluated peak value of the touch point based on sensing values of the plurality of reference sensor pads and the corresponding weights; and determining whether to generate the report for the touch point according to the first evaluated peak value and a first threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
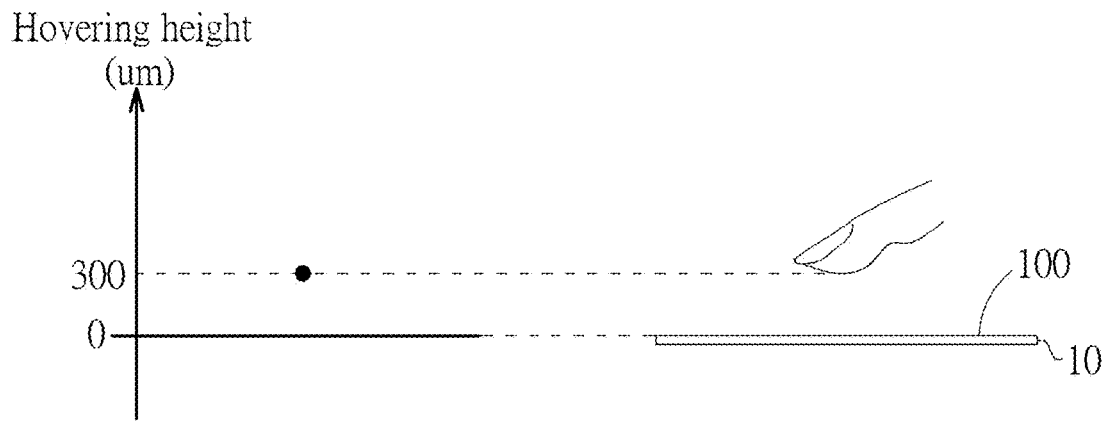
FIG. 1 is a schematic diagram of estimation for a hovering height of a finger according an embodiment of the present invention.
Figure 1:
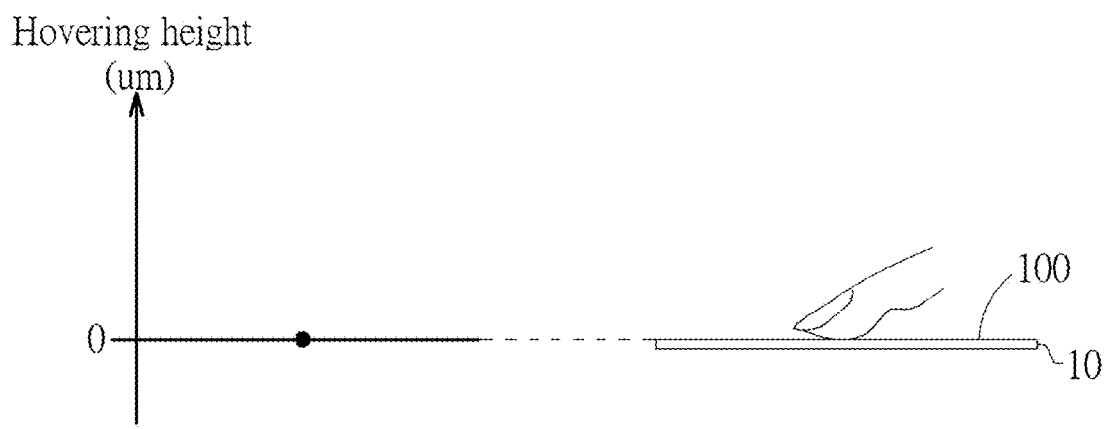
Figure 1:
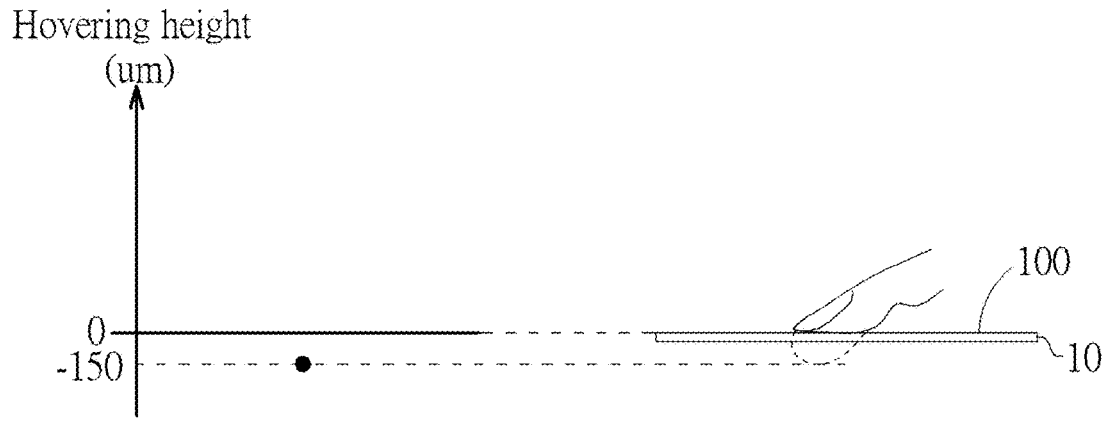

Please refer to FIG. 1, which is a schematic diagram of estimation for a hovering height of a finger (or a stylus)

according to an embodiment of the present invention. In the embodiments of the present invention, the hovering height of a finger is estimated using a touch surface 100 of a touch panel 10 as the reference point (i.e., 0). As shown in case (b), when the finger is just contacting with the touch surface 100 of the touch panel 10, the hovering height is estimated as 0. In this case, the finger touches the surface of the touch panel with the smallest contact area (just one point of contact) When the finger is hovering above the touch surface 100, the hovering height is estimated as a positive value as shown in case (a). In case (a), the finger is close to the touch surface 100 without actually contacting therewith, and the touch panel 10 may detect changes in the sensing values at the moment and start to determine whether to generate a report for the touch event. After the finger contacts the touch surface 100 and continues to press down, the hovering height is estimated as a negative value as shown in case (c). In case (c), the finger makes contact with the touch surface 100. As the finger continues downward, the contact area increases, and the total amount of sensing values detected by the touch panel 10 also increases. The case (c) may occur when using soft materials for touch operations, such as a finger or a rubber tip stylus, and is not limited thereto.

Figure 2:
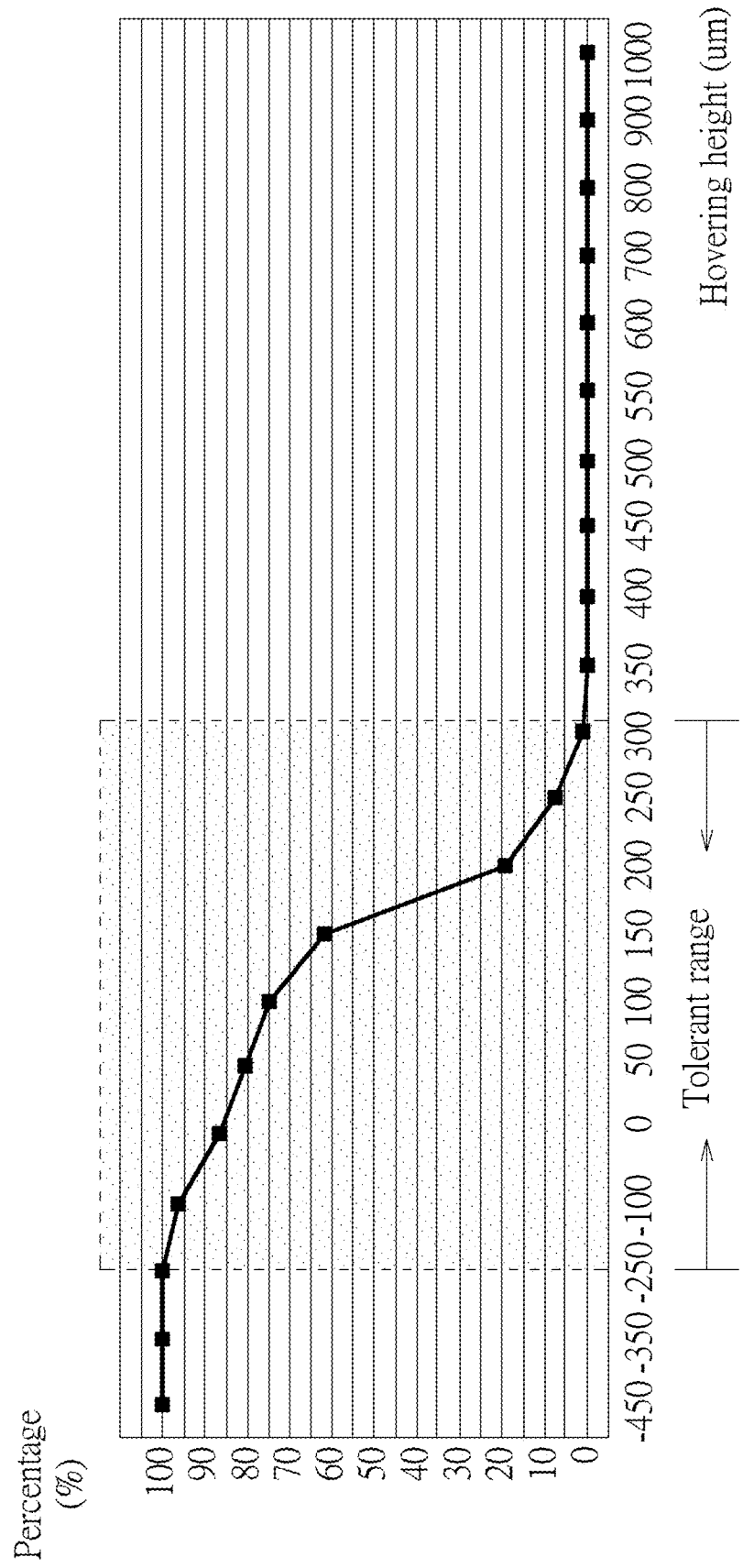
FIG. 2 is a schematic diagram of a test result of generating the report according to an embodiment of the present invention.

Ideally, it is expected that the report is generated only when the finger is as close to the touch surface 100 as possible. However, because the conventional technology cannot accurately estimate the hovering height, there will be inconsistencies in generating or not generating the report at the same vertical height and different horizontal position of the finger. In practice, a tolerant range that produces inaccurate reports is controlled as small as possible, as shown in FIG. 2. FIG. 2 is a schematic diagram of a test result of generating the report according to an embodiment of the present invention. FIG. 2 shows the percentage of reports generated at each hovering height when using test jigs with different radii in different horizontal positions, where the test jigs may be round head copper pillars for simulating fingers or styluses. As shown in FIG. 2, the tolerant range is between hovering heights of −250 μm and 300 um. That is to say, when the hovering height is between −250 μm and 300 um, it cannot be completely guaranteed that at the same vertical height, every different horizontal position may have the same reporting results. It can only be guaranteed that the report is never generated when the hovering height of the finger is above 300 μm, and the report is always generated when the hovering height of the finger is below −250 um.

In order to narrow the tolerant range that represents inconsistencies in report generating results, the hovering height needs to be estimated more accurately regardless of where the finger falls horizontally on the touch panel 10. Therefore, the present invention provides a touch control circuit and a touch detection method thereof for improving the stability of generating the report.

Figure 3:
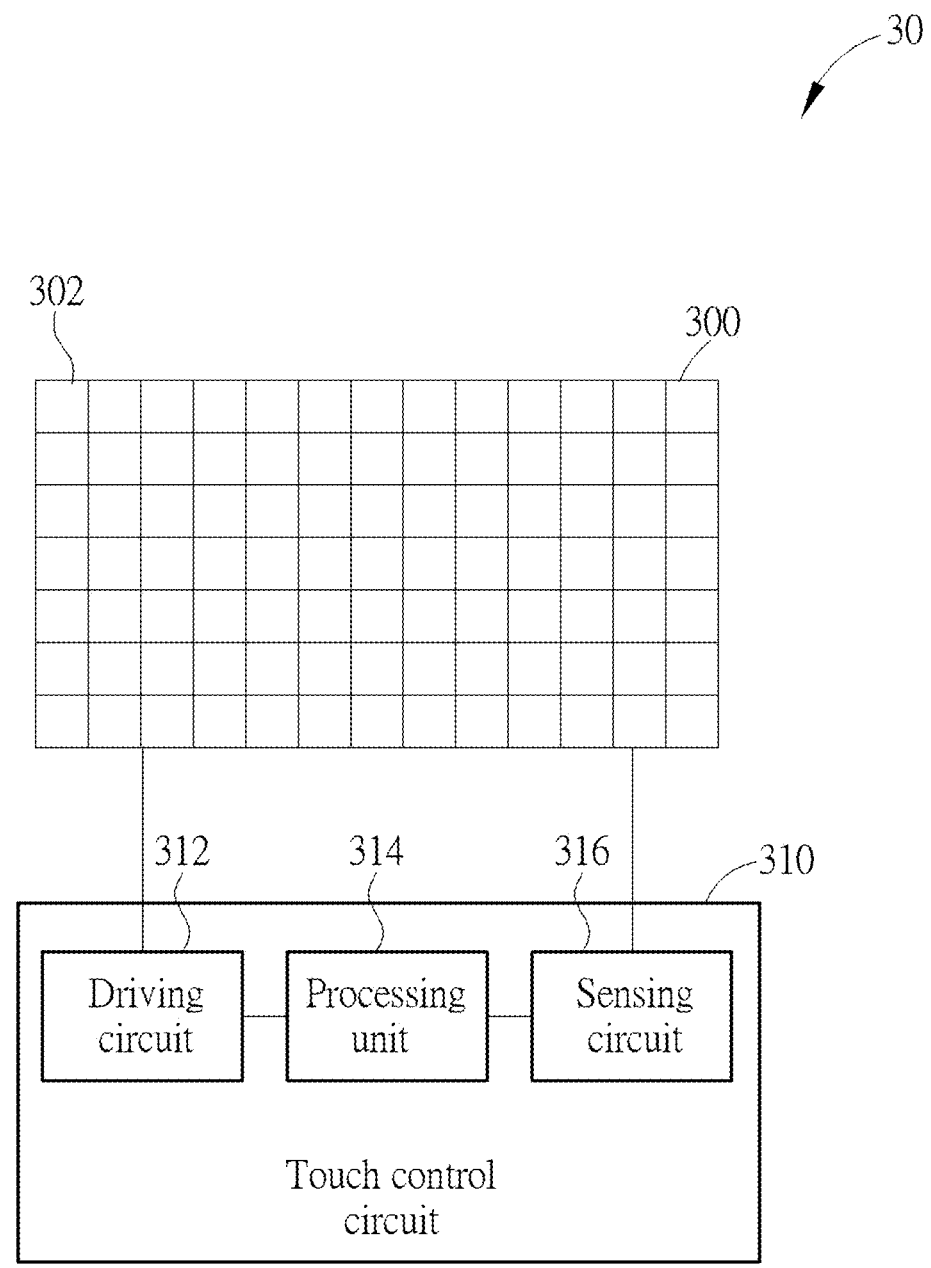
FIG. 3 is a schematic diagram of a touch system according to an embodiment of the present invention.

Please refer to FIG. 3, which is a schematic diagram of a touch system 3 according to an embodiment of the present invention. The touch system 3 may be applied to various electronic devices such as mobile phones, satellite navigation, tablets, personal digital assistants (PDAs), and notebook computers, and is not limited thereto. The touch system 3 is configured to execute a touch detection method for precisely generating the report for touch events according to embodiments of the present invention. It should be noted, the touch system 3 is used to represent the necessary components required to implement the embodiments of the present invention, and those skilled in the art may make various modifications and adjustments accordingly, and is not limited to this.

The touch system 3 comprises a touch panel 300 and a touch control circuit 310. The touch panel 300 may be the touch panel 10 in FIG. 1, and may be and is not limited to a touch panel without any display function or a touchscreen integrated with any kind of display device. The touch panel 300 may comprise a plurality of sensor pads 302 configured to obtain sensing values that may be and not limited to capacitive sensing values. The touch control circuit 310 may comprise a driving circuit 312, a processing unit 314 and a sensing circuit 316. The processing unit 314 is coupled to the driving circuit 312 and the sensing circuit 316, and may control the overall operations of the touch system 30 and execute the touch detection method according to the embodiments of the present invention. For example, the processing unit 314 may be a general purpose processor, a microprocessor or an application specific integrated circuit (ASIC), and is not limited thereto. The driving circuit 312 is coupled to the touch panel 300, and may operate according to control commands of the processing unit 314 to provide driving signals to the touch panel 300. The sensing circuit 316 is coupled to the touch panel 300, and may operate according to control commands of the processing unit 314 to perform sensing to or receiving sensing results from the touch panel 300.

Figure 4:
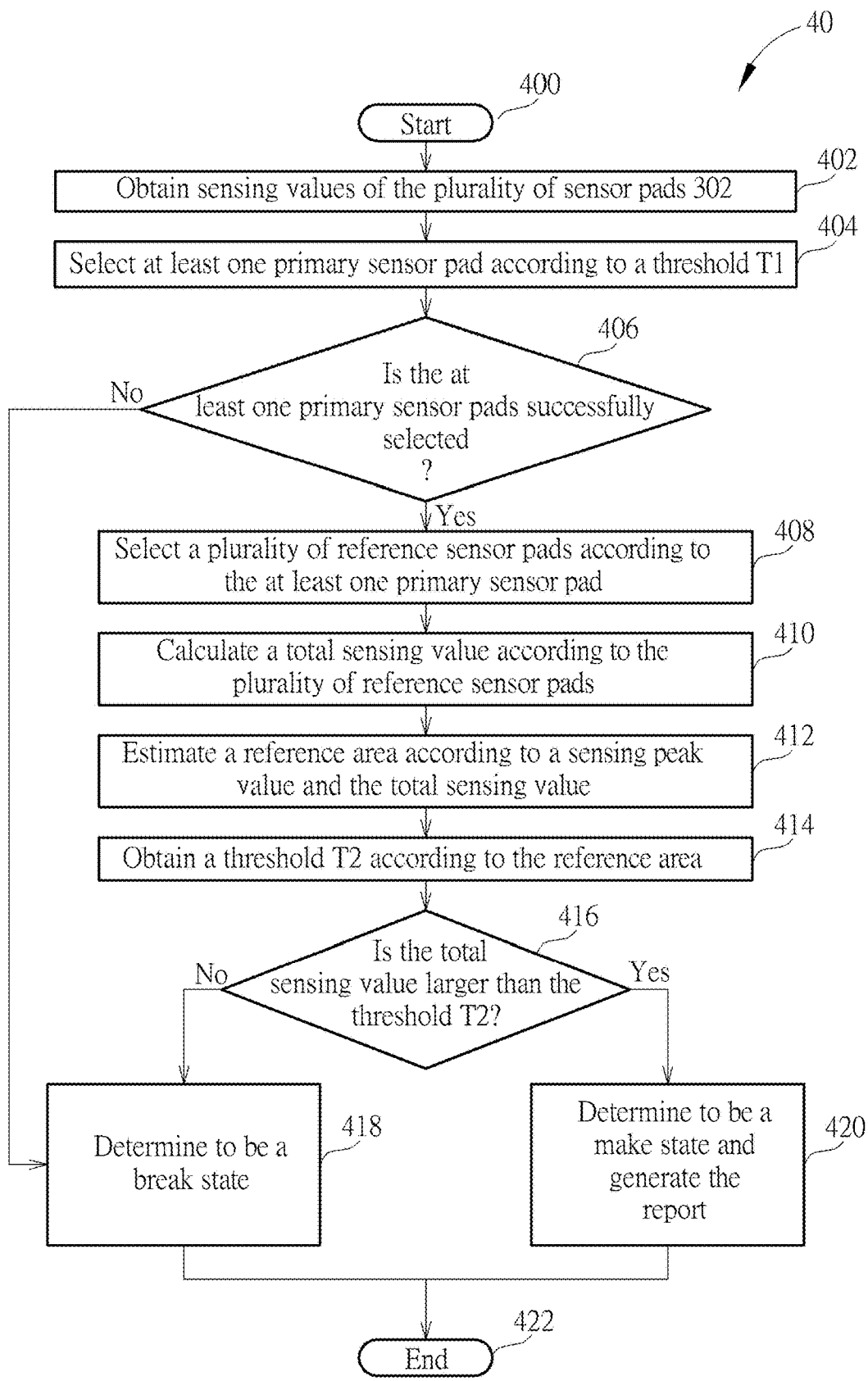
FIG. 4 is a schematic flowchart of a sensing detection process according to an embodiment of the present invention.

The sensing detection method of the present invention may be summarized into a sensing detection process 40 as shown in FIG. 4. The sensing detection process 40 comprises the following steps:

Step 400: Start.
Step 402: Obtain sensing values of the plurality of sensor pads 302.
Step 404: Select at least one primary sensor pad according to a threshold T1.
Step 406: Determine if the at least one primary sensor pads is successfully selected. If yes, proceed to Step 408; otherwise, proceed to Step 418.
Step 408: Select a plurality of reference sensor pads according to the at least one primary sensor pad.
Step 410: Calculate a total sensing value according to the plurality of reference sensor pads.
Step 412: Estimate a reference area according to a sensing peak value and the total sensing value.
Step 414: Obtain a threshold T2 according to the reference area.
Step 416: Determine if the total sensing value is larger than the threshold T2. If yes, proceed to Step 420; other, proceed to Step 418.
Step 418: Determine to be a break state.
Step 420: Determine to be a make state and generate the report.
Step 422: End.

According to the sensing detection process 40, the touch system 30 determines whether to generate a report for a touch event according to the sensing values of the plurality of sensor pads 302. The processing unit 314 first obtains sensing values of the plurality of sensor pads 302 from the sensing circuit 316 (Step 402) and selects at least one primary sensor pad that has lager sensing values according to a threshold T1 (Step 404). If the at least one primary sensor pad is successfully selected (Step 406), the processing unit 314 may further select a plurality of reference sensor pads according to the at least one primary sensor pad so as to determine whether to generate a report (Step 408); otherwise, the processing unit 314 may determine a break state directly for the touch event (Step 418). After the plurality of reference sensor pads are successfully selected, the processing unit 314 may calculate a total sensing value according to the plurality of reference sensor pads (Step 410) and thereby estimate a reference area (Step 412). Based on the reference area, the processing unit 314 may obtain a threshold T2 correspondingly (Step 414) and determine whether to generate the report (Step 418 or Step 420) by comparing the total sensing value with the threshold T2 (Step 416). Accordingly, the processing unit 314 is able to control the report to be generated only below a specific hovering height (for example, below 300 um).

Figure 5:
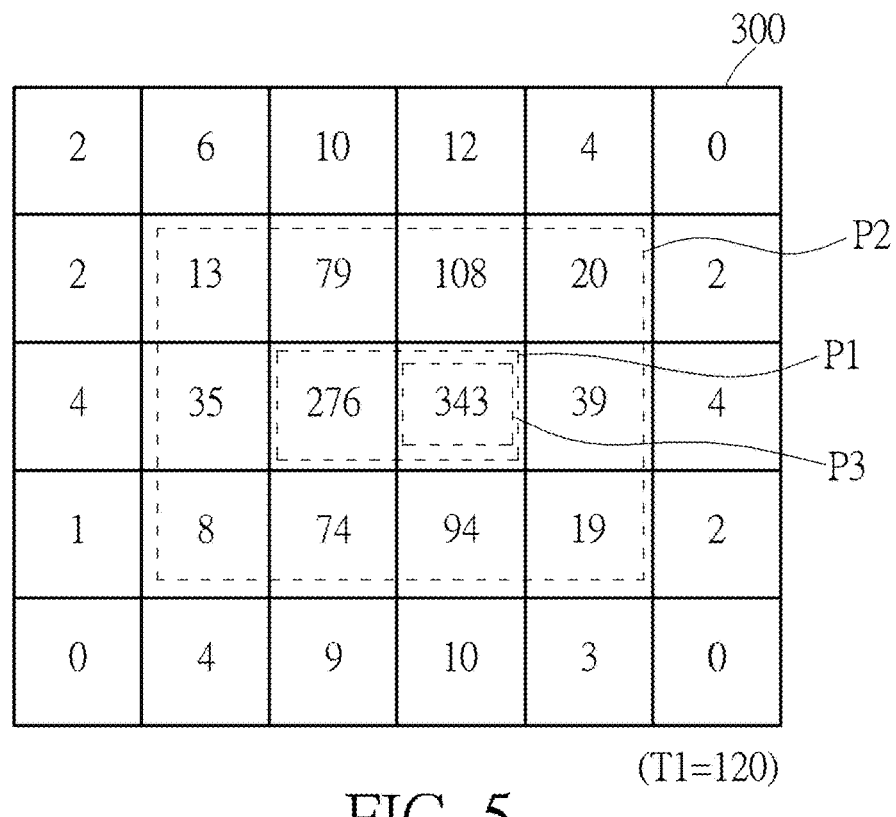
FIG. 5 is a schematic diagram of parts of sensing values of a plurality of sensor pads according to an embodiment of the present invention.

Specifically, please refer to FIG. 5, which is a schematic diagram of parts of sensing values of the plurality of sensor pads 302 according to an embodiment of the present invention. According to the sensing detection process 40, the processing unit 314 obtains sensing values as shown in FIG. 5 (only some parts of the sensor pads are illustrated) in Step 402, and the sensing values may be further used to determine whether to generate the report for the touch event.

Take the threshold T1 120 as an example. The processing unit 314 selects primary sensor pads P1 in Step 404, and then selects reference sensor pads P2 in Step 408. In this embodiment, the primary sensor pads P1 may be selected according to the threshold T1. For example, the sensor pads with sensing values larger than 120 (the threshold T1) may be selected as the primary sensor pads P1. In the embodiment, the reference sensor pads P2 may be selected according to the primary sensor pads P1. For example, the reference sensor pads P2 may be selected as the primary sensor pads P1 with 1 sensor pad extended, and are not limited thereto.

Figure 6:
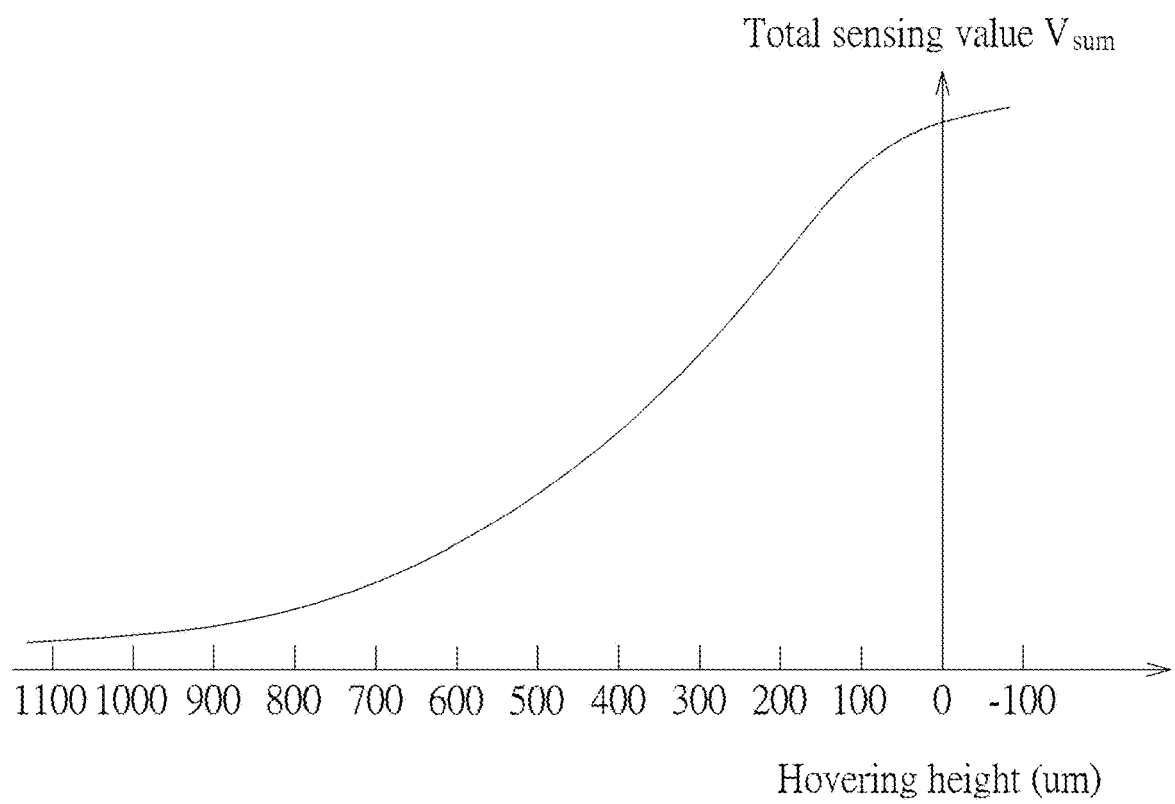
FIG. 6 is a schematic diagram of the relationship between total sensing values and hovering heights of a finger.

In Step 410, the processing unit 314 calculates a total sensing value $V_{sum}$. Specifically, the total sensing value $V_{sum}$ (e.g. 1108) may be obtained by summing the sensing value of each of the reference sensor pads P2. In the embodiment, the total sensing value $V_{sum}$ is used as a basis for evaluating the hovering height of the finger as shown in FIG. 6. FIG. 6 illustrates the relationship between the total sensing value $V_{sum}$ and the hovering height of the finger. When the total sensing value $V_{sum}$ is small, it means that the distance between the finger and the touch surface 100 is long, i.e., the hovering height value is large at this time. When the total sensing value $V_{sum}$ is large, it means that the distance between the finger and the touch surface 100 is short, i.e., the hovering height value is small (even negative) at this time.

In Step 412, the processing unit 314 further estimates a reference area according to a sensing peak value $V_{SP}$ (e.g. 343) measured and the total sensing value $V_{sum}$ obtained in Step 410. The sensing peak value $V_{SP}$ is the maximum sensing value measured from sensor pad P3 among the sensor pads 302. The reference area A1 may be estimated as follows and is not limited thereto.

$$A1 = \frac{V_{sum}}{V_{SP}} \times \text{Scale}, \quad \text{(Eq. 1)}$$

where Scale is a constant to adjust the value of the reference area.

Figure 7:
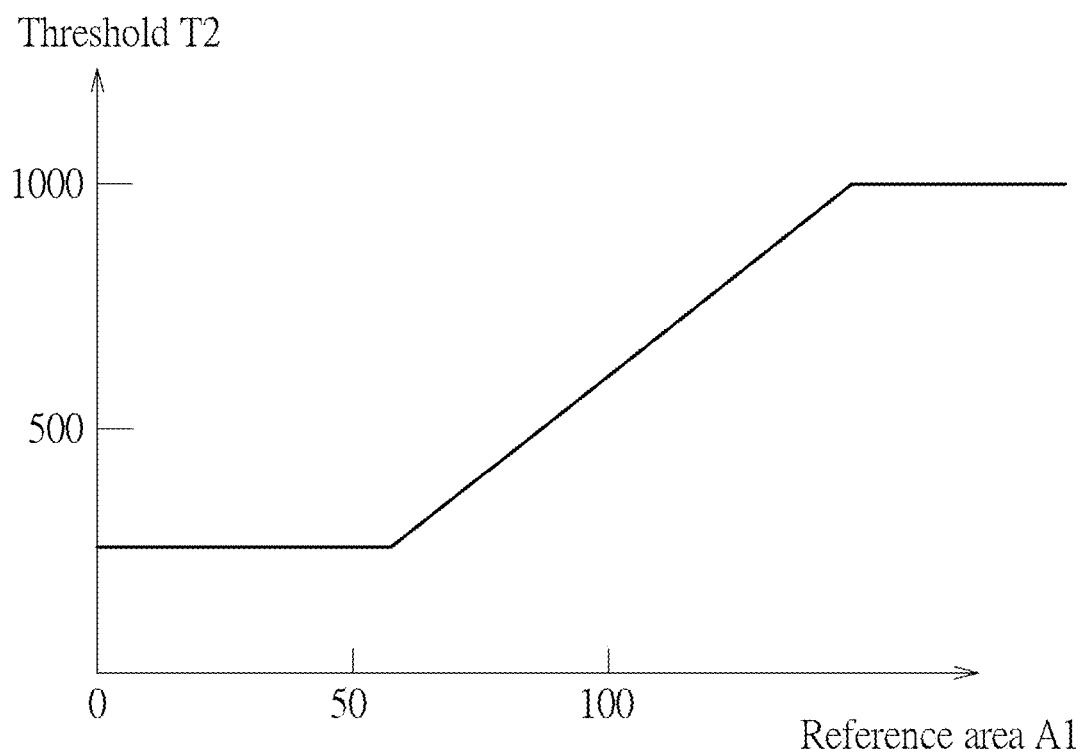
FIG. 7 is a schematic diagram of a mapping of a threshold to a value of a reference area according to an embodiment of the present invention.

In Steps 414-420, the processing unit 314 obtains the threshold T2 corresponding to the reference area A1 and determines whether to generate a report by comparing the threshold T2 with the total sensing value $V_{sum}$. Specifically, the total sensing value $V_{sum}$ measured is also affected by the sensing area. For example, when the sensing area is larger (such as using a thicker test jig), the total sensing value $V_{sum}$ obtained is also larger. In this situation, under the same hovering height, when the sensing area is larger, the total sensing value measured will also be larger. Therefore, the threshold T2 used to determine the hovering height needs to be determined based on the reference area A1, which may be converted through a linear equation, as shown in FIG. 7. FIG. 7 is a schematic diagram of a mapping of the threshold T2 to the value of reference area according to an embodiment of the present invention. Accordingly, the processing unit 314 obtains different thresholds T2 according to different values of reference areas, and thereby may determine whether the finger is lower than the hovering height required for generating the report for different sensing areas. When the total sensing value $V_{sum}$ is larger than the obtained threshold T2, the processing unit 314 determines a make status and generates the report for the touch event. When the total sensing value $V_{sum}$ is smaller than the obtained threshold T2, the processing unit 314 determines a break status for the touch event.

According to the sensing detection process 40, the processing unit 314 considers the sensing area and the hovering height according to the sensing values measured from the plurality of sensor pads 302, and thereby determines whether to generate the report. However, the sensing detection process 40 neglects to consider another important factor that affects the sensing value, that is, the relative position of the finger and the sensor pads 302.

Figure 8:
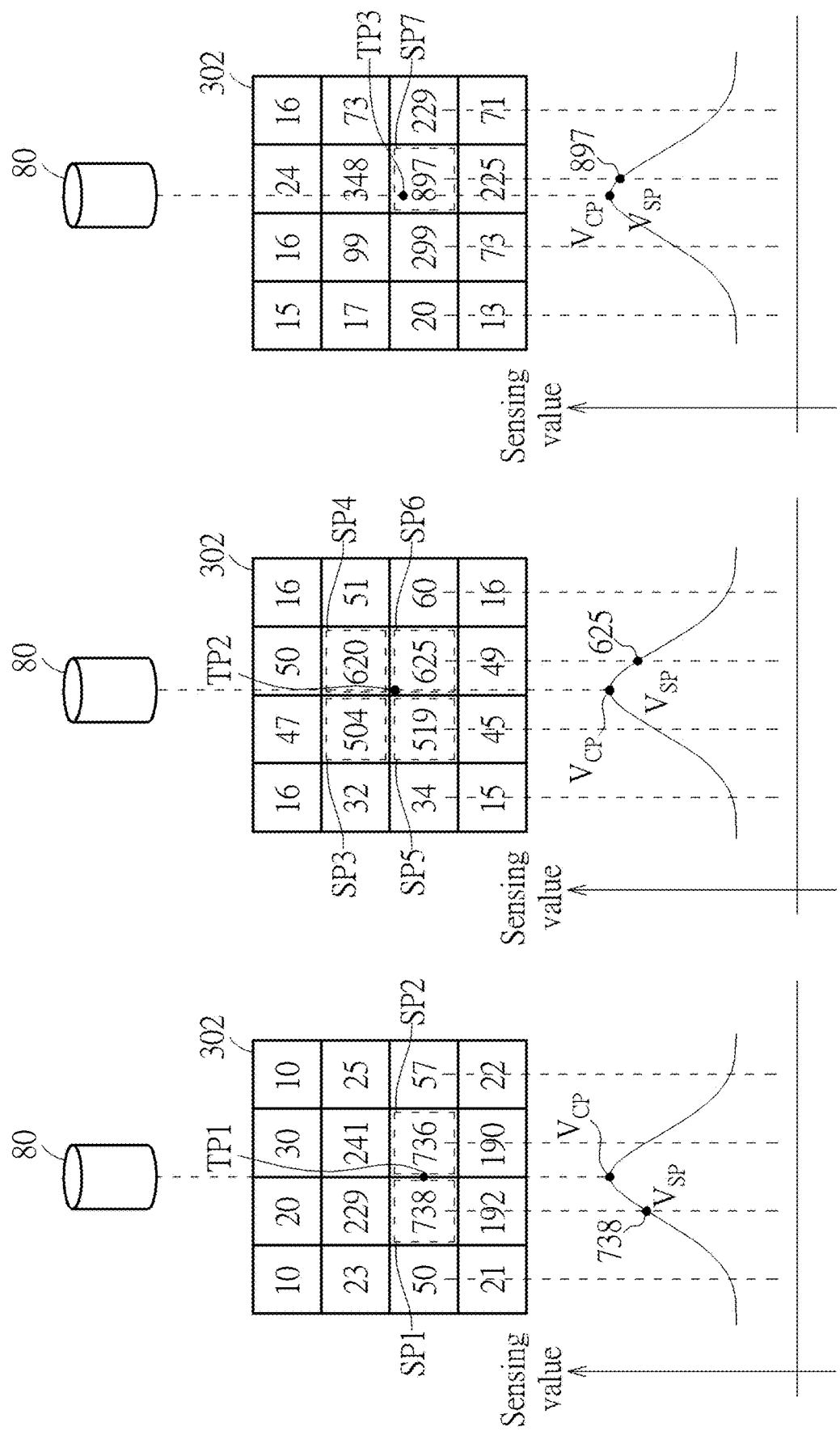
FIG. 8 is a schematic diagram of the difference in sensing values caused by the relative position of position of the touch point and the sensor pads.

Please refer to FIG. 8, which is a schematic diagram showing the difference in sensing values caused by the relative positions of the touch point of a test jig 80 (used to simulate the finger or stylus) and the sensor pads 302 at the same hovering height. When a touch point TP1 is approximately located in the middle of two sensor pads SP1 and SP2, the sensing values measured by the sensing pads SP1 and SP2 are very close. In this case, the sensing peak value $V_{SP}$ may be measured in sensing pad SP1 with a value of 738. When a touch point TP2 is approximately located in the middle of four sensor pads SP3-SP6, the sensing values measured by the sensing pads SP3-SP6 are also close. In this case, the sensing peak value $V_{SP}$ may be measured in sensing pad SP6 with a value of 625. When a touch point TP3 is located inside a sensor pad SP7, the sensing value measured by the sensing pad SP7 is obviously larger than the sensing values measured by the sensing pads surrounding the sensing pad SP7. In this case, the sensing peak value $V_{SP}$ may be measured in sensing pad SP7 with a value of 897. As can be seen, the measured sensing peak value $V_{SP}$ changes significantly according to different horizontal positions of the touch point.

When determining whether to generate the report for the touch event according to the sensing detection process 40, the unstable measurement result of the sensing peak value $V_{SP}$ may also cause inaccuracy in estimating the reference area A1. Therefore, there is a pressing need for further evaluating a more accurate and consistent peak value $V_{CP}$ for the same hovering height as shown in FIG. 8, so as to improve the stability of generating the report.

Figure 9:
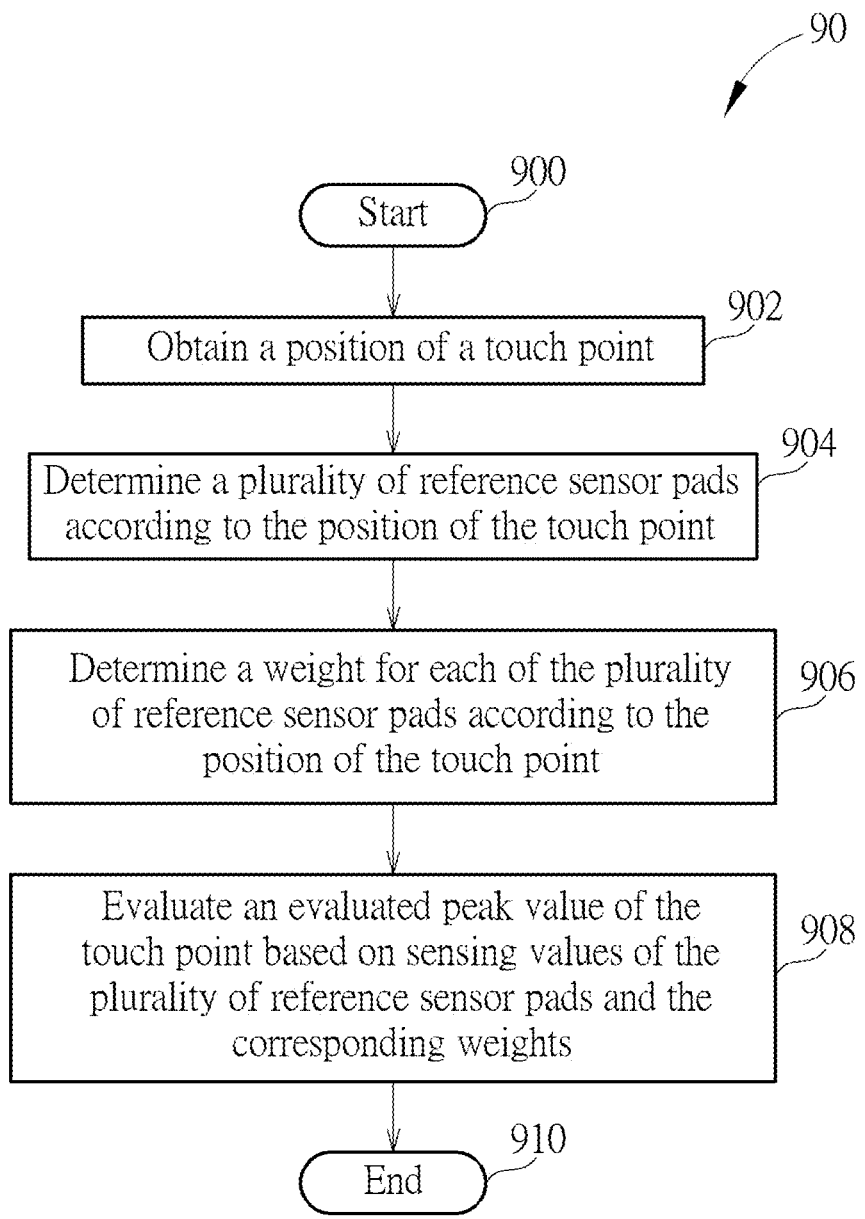
FIG. 9 is a schematic flowchart of peak evaluation process according to an embodiment of the present invention.

A peak evaluation method for improving sensing detection of the present invention may be summarized into a peak evaluation process 90 as shown in FIG. 9. The peak evaluation process 90 includes the following steps:

Step 900: Start.

Step 902: Obtain a position of a touch point.

Step 904: Determine a plurality of reference sensor pads according to the position of the touch point.

Step 906: Determine a weight for each of the plurality of reference sensor pads according to the position of the touch point.

Step 908: Evaluate an evaluated peak value of the touch point based on sensing values of the plurality of reference sensor pads and the corresponding weights.

Step 910: End.

According to the peak evaluation process 90, a more accurate and consistent peak value $V_{CP}$ for the touch event may be evaluated. The processing unit 314 may determine a make state or a break state for the touch system 30 and generate the report accordingly.

Specifically, in Step 902, the processing unit 314 obtains a position of a touch point of the touch event. The position may be regarded as a touch center, and may be obtained from the sensing circuit 316 through conventional methods.

In Step 904, the processing unit 314 determines a plurality of reference sensor pads according to the position of the touch point obtained in Step 902. Specifically, the plurality of reference sensor pads comprise a first sensor pad $P_c$ where the touch point is located and sensor pads surround. The processing unit 314 may use sensing values of the plurality of reference sensor pads to evaluate the evaluated peak value $V_{CP}$.

Figure 10:
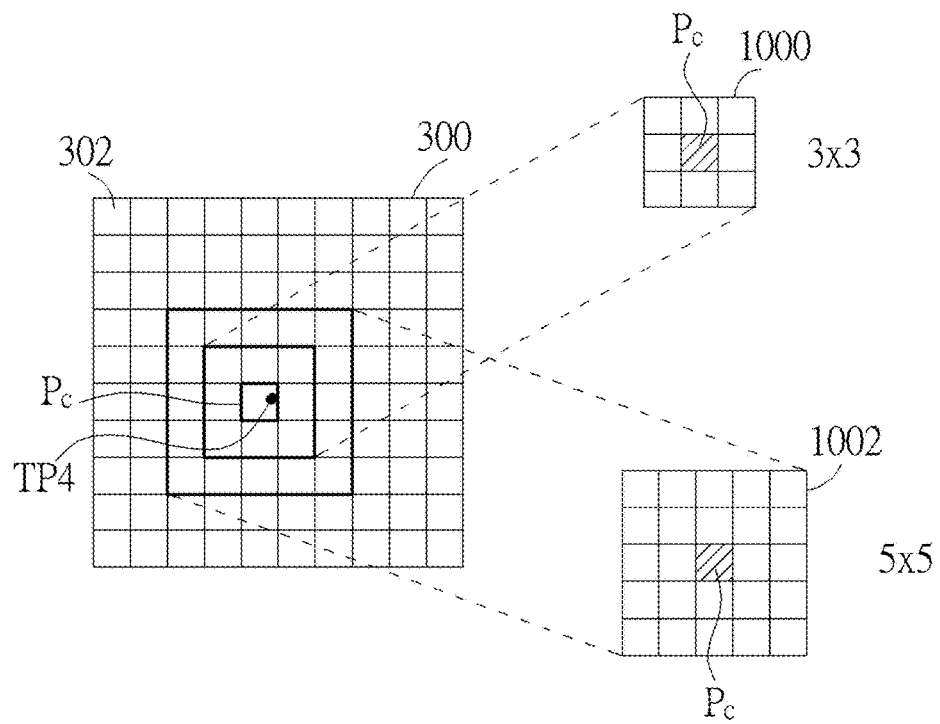
FIG. 10 is a schematic diagram of reference sensor pads according to an embodiment of the present invention.

In an embodiment, the plurality of reference sensor pads are a matrix of sensor pads centered on the sensor pad at the touch point, and the matrix is an N×N matrix. For example, the plurality of reference sensor pads may be a 3×3 or a 5×5 matrix of sensor pads, and are not limited thereto. Please refer to FIG. 10, which is a schematic diagram of reference sensor pads according to an embodiment of the present invention. As shown in FIG. 10, the sensor pad where a touch point TP4 is located is the first sensor pad $P_c$, and the first sensor pad $P_c$ and sensor pads surrounding the first sensor pad $P_c$ may be determined as the plurality of reference sensor pads. In other words, when using a 3×3 matrix of sensor pads, the reference sensor pads may be the first sensor pad $P_c$ with 1 sensor pad extended as sensor pads 1000 shown in FIG. 10. When using a 5×5 matrix of sensor pads, the reference sensor pads may be the first sensor pad $P_c$ with 2 sensor pads extended as sensor pads 1002 shown in FIG. 10.

Figure 11:
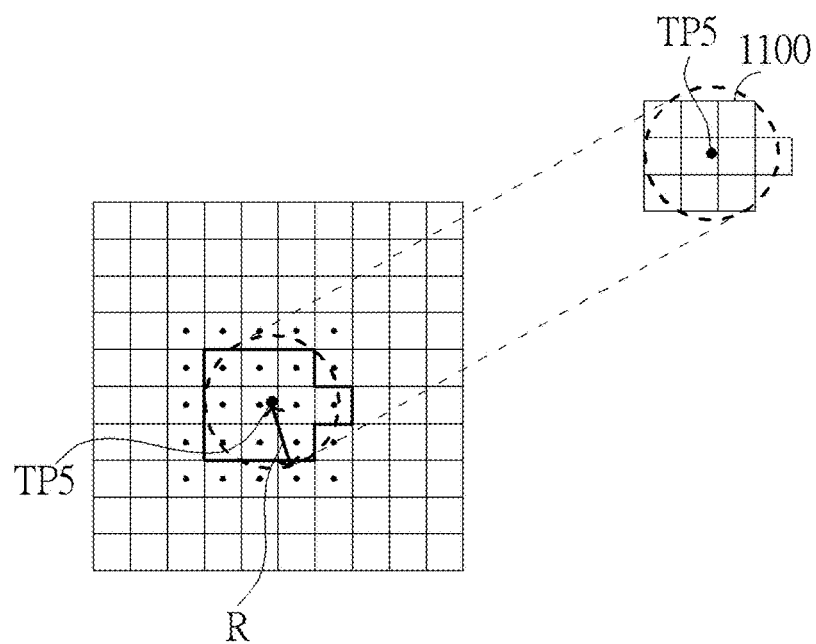
FIG. 11 is a schematic diagram of reference sensor pads according to an embodiment of the present invention.

In an embodiment, a distance between the touch point and a center of each of the plurality of reference sensor pads is smaller than a predetermined length. Please refer to FIG. 11, which is a schematic diagram of reference sensor pads according to an embodiment of the present invention. As shown in FIG. 11, a predetermined length R is used to determine the plurality of reference sensor pads. The sensor pads with a distance to a touch point TP5 being smaller than the predetermined length R may be selected to be the plurality of reference sensor pads as sensor pads 1100 shown in FIG. 11.

In an embodiment, both the methods of determining the reference sensor pads shown in FIG. 10 and FIG. 11 may be simultaneously adopted. In the embodiment, the reference sensor pads may be the intersection of the reference sensor pads selected according to the two different methods.

Figure 12:
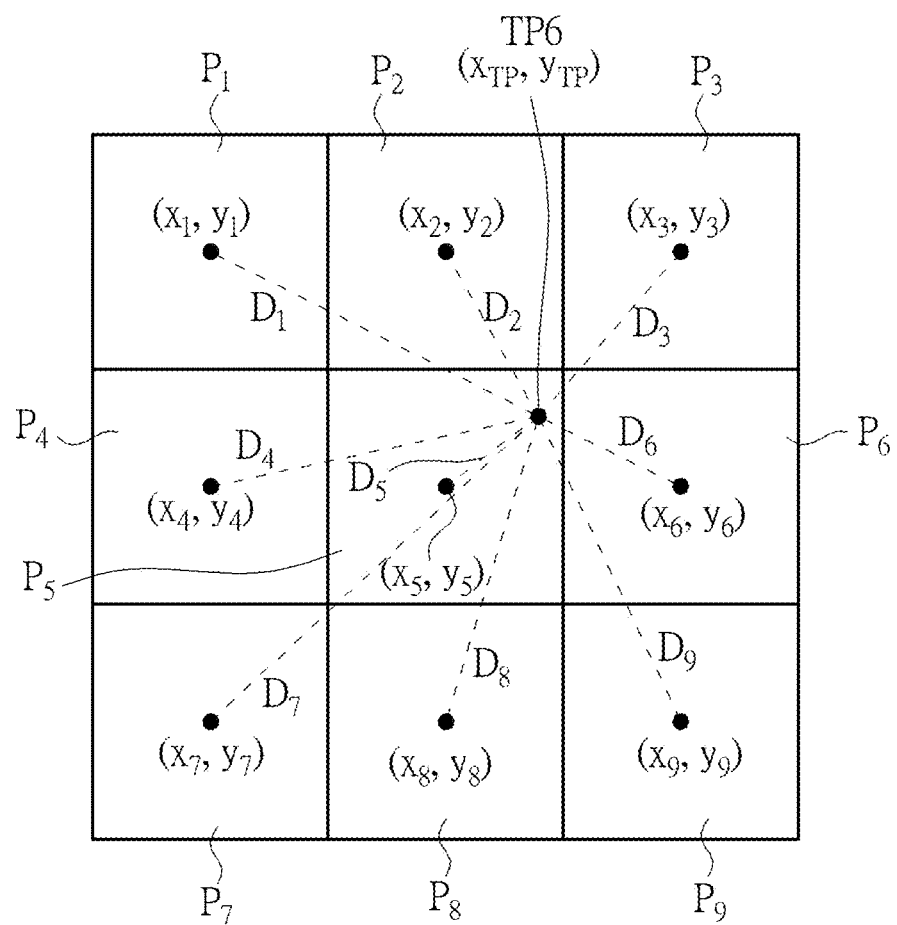
FIG. 12 is a schematic diagram of distances between a touch point and sensor pads according to an embodiment of the present invention.

In Step 906, the processing unit 314 determines a weight for each of the plurality of reference sensor pads according to the position of the touch point. Specifically, the weight for each of the plurality of reference sensor pads is determined according to the distance between the touch point and a center of each of the plurality of reference sensor pads. A distance $D_i$ between a touch point and a center of a sensor pad $P_i$ may be calculated as follows:

$$D_i = |(x_{TP}, y_{TP}) - (x_i, y_i)|, \quad \text{(Eq. 2)}$$

where $(x_{TP}, y_{TP})$ is the coordinate of a touch point TP6, $(x_i, y_i)$ is the coordinate of the center of the sensor pad $P_i$ as shown in FIG. 12. FIG. 12 is a schematic diagram of an example of distances $D_1$-$D_9$ between the touch point TP6 and the sensor pads according to an embodiment of the present invention, where the reference sensor pads are a 3×3 matrix of sensor pads. Preferably, each of the weights has a negative correlation with the distance between the touch point and the center of each of the plurality of reference sensor pads. In other words, the larger the value of distance $D_i$ is, the smaller the weight $W_i$ is, and vice versa. For example, in FIG. 12, the sensor pads $P_5$ should have a larger weight than the sensor pad $P_7$ because the distance $D_5$ between the touch point TP6 and the center of the sensor pad $P_5$ is smaller than the distance $D_7$ between the touch point TP6 and the center of the sensor pad $P_7$. In the embodiment, the weights represent the effects of the sensing values measured by the reference sensor pads on the peak value $V_{CP}$, and the weight of each sensor pad close to the touch point is considered separately according to the distance from the touch point. Accordingly, the problem of inaccurate peak estimation arising from different relative positions of the finger and the sensor pads (as shown in FIG. 8) may be improved.

In Step 908, the processing unit 314 evaluates an evaluated peak value $V_{CP}$ of the touch point based on sensing values of the plurality of reference sensor pads and the corresponding weights $W_i$. The evaluated peak value $V_{CP}$ may be calculated as follows:

$$V_{CP} = \sum_{i=1}^{i=n} W_i \times V_i, \quad \text{(Eq. 3)}$$

where n is a number of the reference sensor pads, $W_i$ is the weight for the sensor pad $P_i$, and $V_i$ is the sensing value measured from the sensor pad $P_i$.

Accordingly, the more accurate peak value $V_{CP}$ may be evaluated according to the peak evaluation process 90, and accordingly, the processing unit 314 may determine whether to make the report for the touch point according to the evaluated peak value $V_{CP}$.

Figure 13:
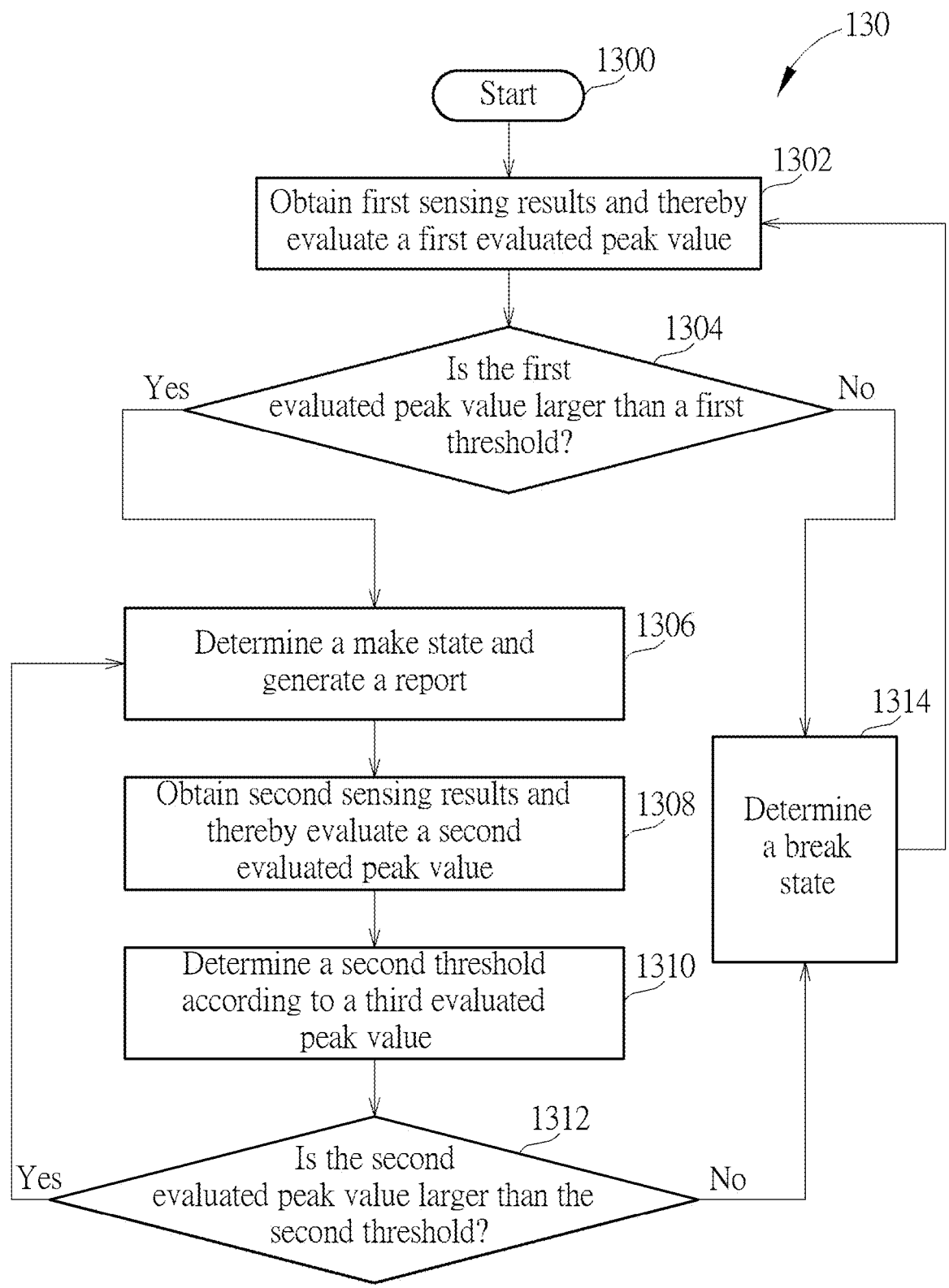
FIG. 13 is a schematic flowchart of a sensing detection process according to an embodiment of the present invention.

A sensing detection method using the evaluated peak value $V_{CP}$ according to an embodiment of the present invention may be summarized into a sensing detection process 130 as shown in FIG. 13. The sensing detection process 130 comprises the following steps:

Step 1300: Start.

Step 1302: Obtain first sensing results and thereby evaluate a first evaluated peak value.

Step 1304: Determine whether the first evaluated peak value is larger than a first threshold. If yes, proceed to Step 1306; otherwise, proceed to Step 1314.

Step 1306: Determine to be a make state and generate a report.

Step 1308: Obtain second sensing results and thereby evaluate a second evaluated peak value.

Step 1310: Determine a second threshold according to a third evaluated peak value.

Step 1312: Determine whether the second evaluated peak value is larger than the second threshold. If yes, proceed to Step 1306; otherwise, proceed to Step 1314.

Step 1314: Determine to be a break state, and proceed to Step 1302.

According to the sensing detection process 130, the processing unit 314 continuously determines whether to generate the report for touch events. The processing unit 314 may continuously obtain the sensing results from the sensing circuit 316 and thereby calculate the evaluated peak values according to the peak evaluation process 90. At first, the processing unit 314 may determine a make state or a break state for the touch system 30 according to a first evaluated peak value and a first threshold. When the touch system 30 is in the make state, the processing unit 314 may further determine whether to switch back to the break state or not according to a second evaluated peak value and a second threshold.

In Step 1302, the processing unit 314 obtains first sensing results and thereby evaluates a first evaluated peak value. The processing unit 314 may obtain the first sensing results, such as a position of the touch point and sensing values measured by the plurality of sensor pads 302, necessary for evaluating the first evaluated peak value from the sensing circuit 316. The first evaluated peak value may be evaluated according to the peak evaluation process 90.

In Step 1304, the processing unit 314 compares the first evaluated peak value with a first threshold, and determines whether to switch from a break state to a make state. Since the first evaluated peak value evaluated through the peak evaluation process 90 is stable and accurate, the processing unit 314 is able to more accurately evaluate the hovering height of the finger through the first evaluated peak value. Therefore, the first threshold may be set as a constant value to effectively distinguish whether the hovering height corresponding to the first evaluated peak value is higher or lower than a boundary height that is expected to start generating the report. When the first evaluated peak value is larger than the first threshold, it means the hovering height of the finger is lower than the boundary height. In other words, the finger and the surface of the touch panel 300 are close enough to generate the report. In this situation, the processing unit 314 determines to switch from the break state to the make state in Step 1306. Otherwise, the processing unit 314 determines to stay in the break state in Step 1314.

In Step 1308, the processing unit 314 obtains second sensing results and thereby evaluates a second evaluated peak value. The processing unit 314 may obtain the second sensing results, such as a position of the touch point and sensing values measured by the plurality of sensor pads 302, necessary for evaluating the second evaluated peak value from the sensing circuit 316. The second evaluated peak value may be evaluated according to the peak evaluation process 90. Specifically, the touch system 30 is in the make state, and the processing unit 314 continuously obtains the sensing results for further determining whether to switch from the make state to the break state.

In Step 1310, the processing unit 314 determines a second threshold according to a third evaluated peak value. Since the finger's operation on the touch panel 300 changes all the time, including contact area, speed, hovering height, etc., the evaluated peak value may also change at any time. Therefore, the second threshold is to detect a "sudden decrease" to determine to enter the break state in the make state. For the stable report generating, the processing unit 314 will switch from the make state to the break state only when the second evaluated peak value changes drastically (such as a sharp decrease). In the embodiment, the second threshold may be determined according to the third evaluated peak value, and the third evaluated peak value is determined according to the first evaluated peak value and the second evaluated peak value by performing filtering operation using a filter. The filter may be an infinite impulse response (IIR) filter, and is not limited thereto. Specifically, the processing unit 314 continuously calculates the evaluated peak values according to the sensing results obtained from the sensing circuit 316, and all the evaluated peak values are input into the IIR filter to perform filtering operation to obtain the third evaluated peak value. The third evaluated peak value may be evaluated as follows:

$$V_{IIR}(t) = a \times V_{IIR}(t-1) + b \times V_{CP}(t), \quad \text{(Eq. 4)}$$

where $V_{IIR}(t)$ is the IIR result at time t (the third evaluated peak value), $V_{IIR}(t-1)$ is the IIR result at time t−1, $V_{CP}(t)$ is the newest evaluated peak value at time t, and a and b are coefficients for the IIR filter, which should be determined according to the actual requirements. In short, the third evaluated peak value of the embodiment is the filtered result obtained through the IIR filter from all the past evaluated peak values. In the embodiment, the second threshold may be set as follows:

$$TH_{Break} = c \times V_{IIR}(t-1), \ 0 < c < 1, \quad \text{(Eq. 5)}$$

where $TH_{Break}$ is the second threshold, $V_{IIR}(t-1)$ is the IIR result at time t−1 (the previous third evaluated peak value), and c is a constant value to determine the range of changes required to switch from the make state to the break state; for example, c may be set to 0.5 and is not limited thereto.

It should be noted that, the first threshold for determining from the break state to the make state in Step 1304 is a constant value; however, the second threshold for determining from the make state to the break state in Step 1310 is a changeable value based on the sensing values.

In Step 1312, the processing unit 314 compares the third evaluated peak value with the second threshold, and determines whether to switch from the make state to the break state. When the third evaluated peak value is smaller than the second threshold, the processing unit 314 switches from the make state to the break state and stops generating the report in Step 1314. When the third evaluated peak value is larger than the second threshold, the processing unit 314 keeps the make state and continues to generate the report in Step 1306.

Accordingly, the processing unit 314 determines whether to generate the report using the evaluated peak value according to the touch detection process 130. In this embodiment, the peak value is accurately evaluated by fully considering the effect of the distance of each sensor pad on the pressing point, thus avoiding unstable peak values measured at different horizontal touch positions due to low sensor pad density. As a result, the hovering height of the finger is more accurately estimated, and the accuracy of report generation is thereby improved. The tolerant range as shown in FIG. 2 may therefore be greatly narrowed. In other words, the report may be generated only when the finger is closer to the surface of the touch panel 300.

In summary, the present invention provides a touch control circuit and a touch detection method thereof for accurately evaluating the peak value and determining of generating reports, so as to improve the shortcomings of the prior art.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A touch detection method for generating a report, comprising:
obtaining a position of a touch point;
determining a plurality of reference sensor pads according to the position of the touch point;
determining a weight for each of the plurality of reference sensor pads according to the position of the touch point;
evaluating a first evaluated peak value of the touch point based on sensing values of the plurality of reference sensor pads and the corresponding weights; and
determining whether to generate the report for the touch point according to the first evaluated peak value and a first threshold.

2. The touch detection method of claim 1, wherein the plurality of reference sensor pads comprise a first sensor pad at which the touch point is located and a plurality of sensor pads surrounding the first sensor pad.

3. The touch detection method of claim 1, wherein the plurality of reference sensor pads are a matrix of sensor pads centered on a sensor pad at the touch point, and the matrix is an N×N matrix.

4. The touch detection method of claim 3, wherein the matrix is a 3×3 matrix or a 5×5 matrix.

5. The touch detection method of claim 1, wherein a distance between the touch point and a center of each of the plurality of reference sensor pads is smaller than a predetermined length.

6. The touch detection method of claim 1, wherein the step of determining the weight for each of the plurality of reference sensor pads according to the position of the touch point comprises determining the weight according to a distance between the touch point and a center of each of the plurality of reference sensor pads.

7. The touch detection method of claim 6, wherein each of the weights has a negative correlation with the distance between the touch point and the center of each of the plurality of reference sensor pads.

8. The touch detection method of claim 1, wherein the step of determining whether to generate the report for the touch point according to the first evaluated peak value and the first threshold comprises:
in response to the first evaluated peak value being larger than the first threshold, switching from a break state to a make state and generating the report; and
in response to the first evaluated peak value being smaller than the first threshold, keeping in the break state.

9. The touch detection method of claim 8, further comprising the following steps in response to being in the make state:
evaluating a second evaluated peak value of a new touch point; and
determining whether to generate the report for the new touch point according to the second evaluated peak value and a second threshold.

10. The touch detection method of claim 9, wherein the step of determining whether to generate the report for the new touch point according to the second evaluated peak value and the second threshold comprises:
in response to the second evaluated peak value being larger than the second threshold, keeping in the make state and generating the report; and
in response to the second evaluated peak value being smaller than the second threshold, switching from the make state to the break state.

11. The touch detection method of claim 10, wherein the second threshold is determined according to a third evaluated peak value; and the third evaluated peak value is determined according to the first evaluated peak value and the second evaluated peak value by performing filtering operation using a filter.

12. The touch detection method of claim 11, wherein the filter is an infinite impulse response (IIR) filter.

13. A touch control circuit for generating a report, comprising:
a driving circuit, coupled to a touch panel, configured to provide driving signals to the touch panel;
a sensing circuit, coupled to a plurality of sensor pads of the touch panel; and
a processing unit, coupled to the driving circuit and the sensing circuit;
wherein the processing unit obtains a position of a touch point from the sensing circuit; determines a plurality of reference sensor pads according to the position of the touch point; determines a weight for each of the plurality of reference sensor pads according to the position of the touch point; evaluates a first evaluated peak value of the touch point based on sensing values of the plurality of reference sensor pads and the corresponding weights; and determines whether to generate the report for the touch point according to the first evaluated peak value and a first threshold.

14. The touch control circuit of claim 13, wherein the plurality of reference sensor pads comprise a first sensor pad at which the touch point is located and a plurality of sensor pads surrounding the first sensor pad.

15. The touch control circuit of claim 13, wherein the plurality of reference sensor pads are a matrix of sensor pads centered on a sensor pad at the touch point, and the matrix is a N×N matrix.

16. The touch control circuit of claim 15, wherein the matrix is a 3×3 matrix or a 5×5 matrix.

17. The touch control circuit of claim 13, wherein a distance between the touch point and a center of each of the plurality of reference sensor pads is smaller than a predetermined length.

18. The touch control circuit of claim 13, wherein the processing unit determines the weight according to a distance between the touch point and a center of each of the plurality of reference sensor pads to determine the weight for each of the plurality of reference sensor pads according to the position of the touch point.

19. The touch control circuit of claim 18, wherein each of the weights has a negative correlation with the distance between the touch point and the center of each of the plurality of reference sensor pads.

20. The touch control circuit of claim 13, wherein
in response to the first evaluated peak value being larger than the first threshold, the processing unit switches from a break state to a make state and generates the report; and
in response to the first evaluated peak value being smaller than the first threshold, the processing unit keeps in the break state.

21. The touch control circuit of claim 20, wherein in response to being in the make state, the processing unit further evaluates a second evaluated peak value of a new touch point and determines whether to generate the report for the new touch point according to the second evaluated peak value and a second threshold.

22. The touch control circuit of claim 21, wherein in response to the second evaluated peak value being larger than the second threshold, the processing unit keeps in the make state and generating the report; and in response to the second evaluated peak value being smaller than the second threshold, the processing unit switches from the make state to the break state.

23. The touch control circuit of claim 22, wherein the second threshold is determined according to a third evaluated peak value; and the third evaluated peak value is determined according to the first evaluated peak value and the second evaluated peak value by performing filtering operation using a filter.

24. The touch control circuit of claim 23, wherein the filter is an infinite impulse response (IIR) filter.

* * * * *